(12) United States Patent
Chou

(10) Patent No.: US 6,845,997 B2
(45) Date of Patent: Jan. 25, 2005

(54) BICYCLE WITH ADJUSTABLE HANDLEBAR AND SEAT UNITS

(75) Inventor: Joe Chou, Tai-Ping (TW)

(73) Assignee: Giant Manufacturing Co., Ltd., Taichung Hsien (TW)

( * ) Notice: Subject to any disclaimer, the term of this patent is extended or adjusted under 35 U.S.C. 154(b) by 0 days.

(21) Appl. No.: 10/446,305

(22) Filed: May 27, 2003

(65) Prior Publication Data

US 2004/0239072 A1 Dec. 2, 2004

(51) Int. Cl.[7] .............................................. B62K 15/00
(52) U.S. Cl. ................................... 280/278; 280/288.1
(58) Field of Search ................................ 280/287, 278, 280/288.1, 281.1

(56) References Cited

U.S. PATENT DOCUMENTS

| | | | | |
|---|---|---|---|---|
| 2,482,472 A | * | 9/1949 | Fried | 280/261 |
| 4,925,203 A | * | 5/1990 | Buckler | 280/278 |
| 5,261,686 A | * | 11/1993 | Buckler | 280/274 |
| 5,509,678 A | * | 4/1996 | Ullman et al. | 280/281.1 |
| 5,584,494 A | * | 12/1996 | Krumm | 280/288.1 |
| 5,853,062 A | * | 12/1998 | Hulett | 180/206 |
| 6,203,043 B1 | * | 3/2001 | Lehman | 280/288.1 |
| 6,527,291 B1 | * | 3/2003 | Hurtig | 280/288.1 |
| 2003/0155738 A1 | * | 8/2003 | Chen et al. | 280/278 |

FOREIGN PATENT DOCUMENTS

DE 3837018 A1 * 5/1990 ............ B62K/3/02

* cited by examiner

*Primary Examiner*—Kevin Hurley
(74) *Attorney, Agent, or Firm*—Christensen O'Connor Johnson Kindness PLLC

(57) ABSTRACT

A bicycle includes a bicycle frame, a wheel set, a treading unit, a handlebar unit, and a seat unit. The bicycle frame has front and rear ends. The wheel set includes front and rear wheels disposed respectively on the front and rear ends of the bicycle frame. The treading unit is mounted on the bicycle frame for transmitting treading power to the wheel set. The handlebar unit is mounted on the bicycle frame and is coupled to the front wheel to permit steering of the front wheel. The handlebar unit is pivotable toward and away from the rear end of the bicycle frame. The seat unit is mounted adjustably on the bicycle frame to permit height adjustment thereof relative to the handlebar unit.

6 Claims, 13 Drawing Sheets

BICYCLE WITH ADJUSTABLE HANDLEBAR AND SEAT UNITS

BACKGROUND OF THE INVENTION

1. Field of the Invention

The invention relates to a bicycle, more particularly to a bicycle with adjustable handlebar and seat units.

2. Description of the Related Art

Referring to FIG. 1, a conventional bicycle 10 includes a bicycle frame 11, a wheel set 12 including front and rear wheels disposed respectively on the front and rear ends of the bicycle frame 11, a treading unit 13 mounted on the bicycle frame 12 for transmitting treading power to the wheel set 12, a seat unit 14 mounted on the bicycle frame 11, and a handlebar unit 15 mounted on the bicycle frame 11 and coupled to the front wheel 121 to permit steering of the front wheel.

In the conventional bicycle 10, the height of the seat unit 14 from the ground is adjustable. However, the distance of the seat unit 14 from the handlebar unit 15 is not adjustable. Moreover, the height and inclination of the handlebar unit 15 are also not adjustable. It is thus difficult for the user to maintain a comfortable riding pose, which results in a sore back or arms after riding for a long period of time.

SUMMARY OF THE INVENTION

Therefore, the object of the present invention is to provide a bicycle with adjustable handlebar and seat units that can overcome the aforesaid drawbacks associated with the prior art.

Accordingly, the bicycle of this invention comprises a bicycle frame, a wheel set, a treading unit, a handlebar unit, and a seat unit.

The bicycle frame has front and rear ends. The wheel set includes front and rear wheels disposed respectively on the front and rear ends of the bicycle frame. The treading unit is mounted on the bicycle frame and is operated to transmit treading power to the wheel set. The handlebar unit is mounted on the bicycle frame and is coupled to the front wheel to permit steering of the front wheel. The handlebar unit is pivotable toward and away from the rear end of the bicycle frame. The seat unit is mounted adjustably on the bicycle frame to permit height adjustment thereof relative to the handlebar unit.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
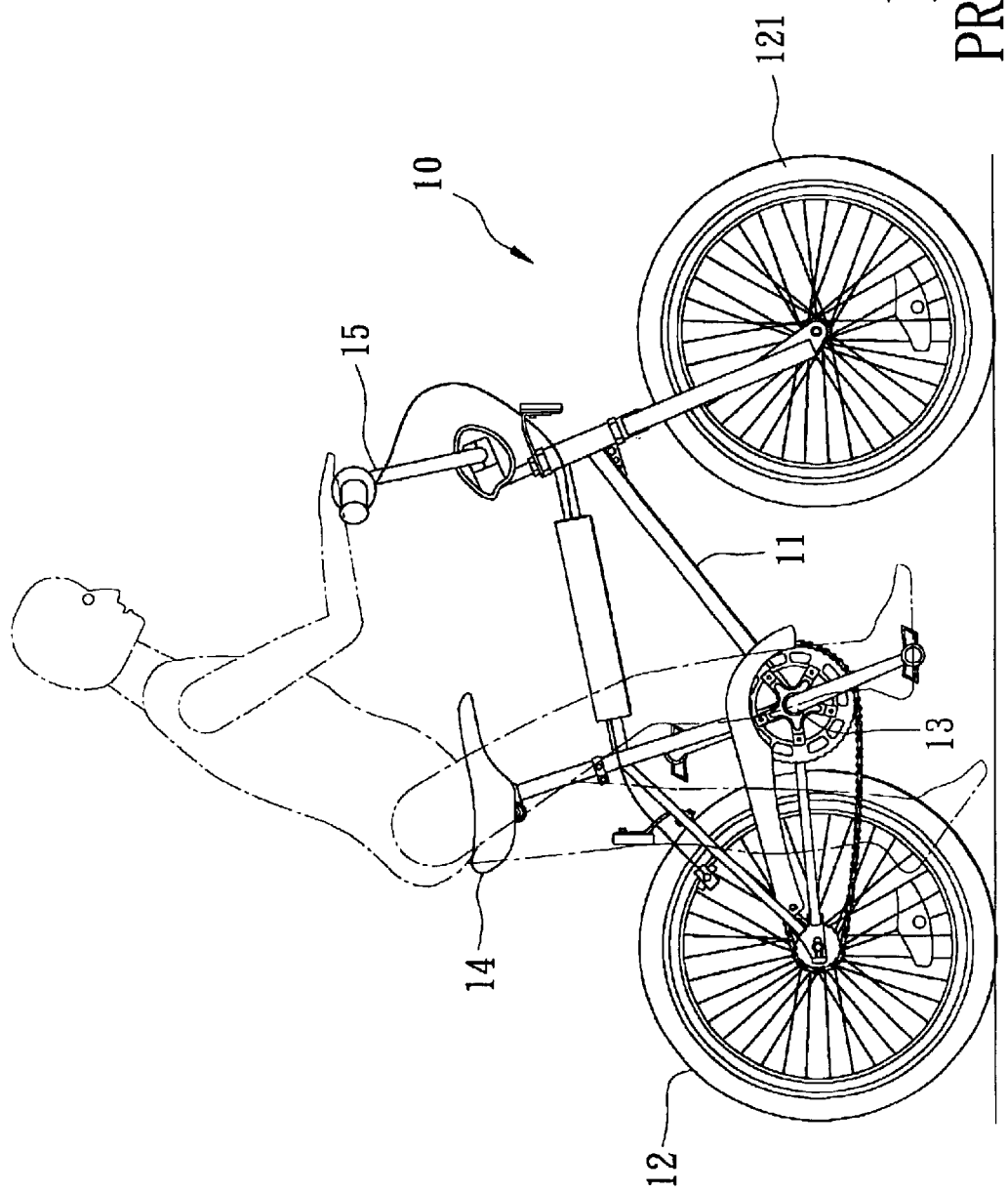
FIG. 1 is a schematic diagram illustrating a conventional bicycle.
Figure 2:
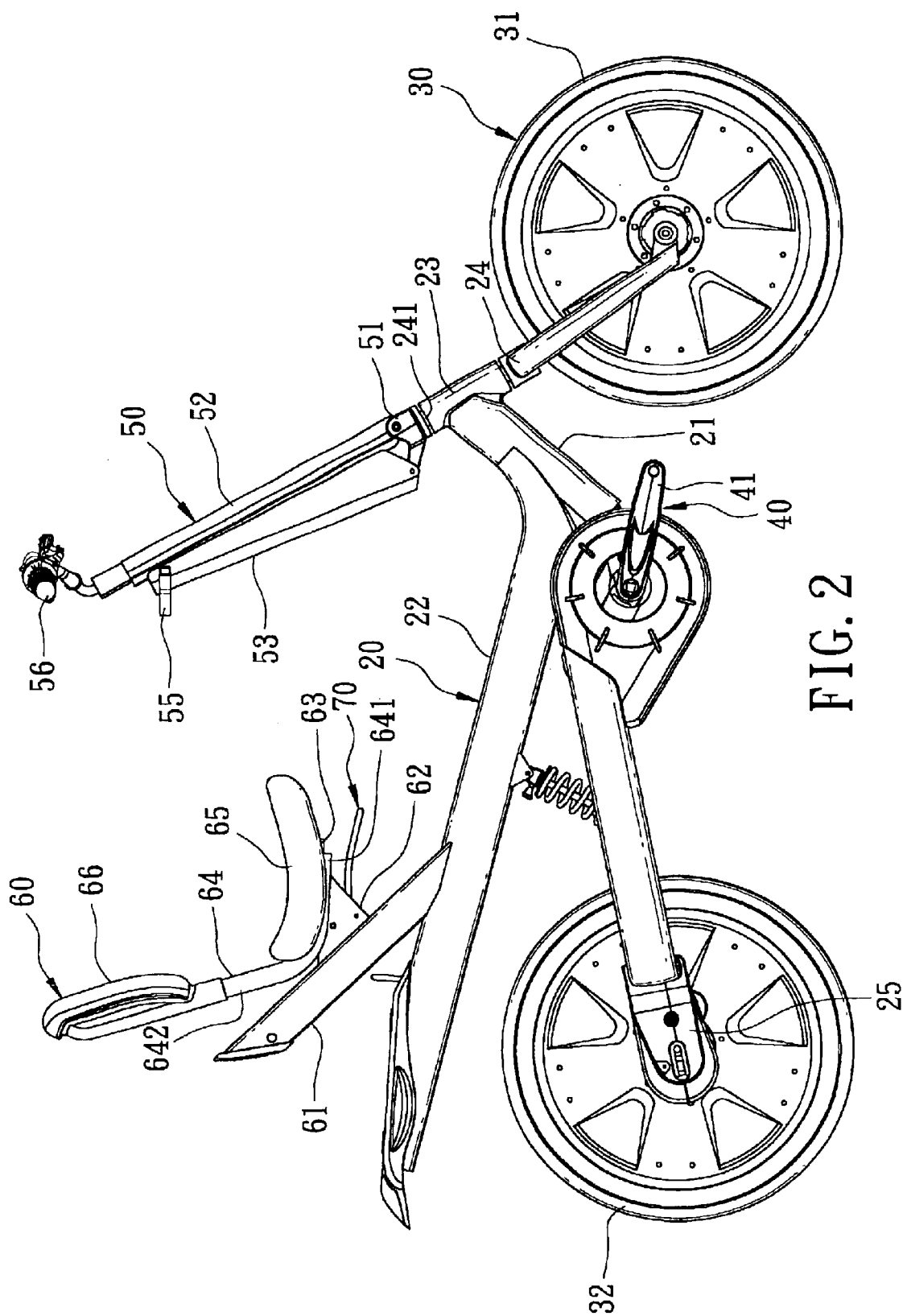
FIG. 2 is a schematic diagram illustrating the preferred embodiment of a bicycle according to the present invention.

Referring to FIG. 2, the preferred embodiment of a bicycle according to the present invention is shown to include a bicycle frame 20, a wheel set 30, a treading unit 40, a handlebar unit 50, and a seat unit 60.

The bicycle frame 20 includes a front frame member 21, a top frame member 22 extending rearwardly and inclining upwardly from the front frame member 21, a head tube 23 mounted on a front end of the front frame member 21, a front fork 24 connected rotatably to the head tube 23, and a rear fork 25 extending rearwardly from the front frame member 21.

The wheel set 30 includes front and rear wheels 31, 32 mounted rotatably and respectively on the front and rear forks 24, 25 of the bicycle frame 20.

The treading unit 40 includes a pair of pedals 41 mounted on lateral sides of the front frame member 21 of the bicycle frame 20, and a transmission mechanism (not shown) such that treading power on the pedals 41 can be transmitted to the rear wheel 32 of the wheel set 30 so as to drive advancing movement of the bicycle.

Figure 3:
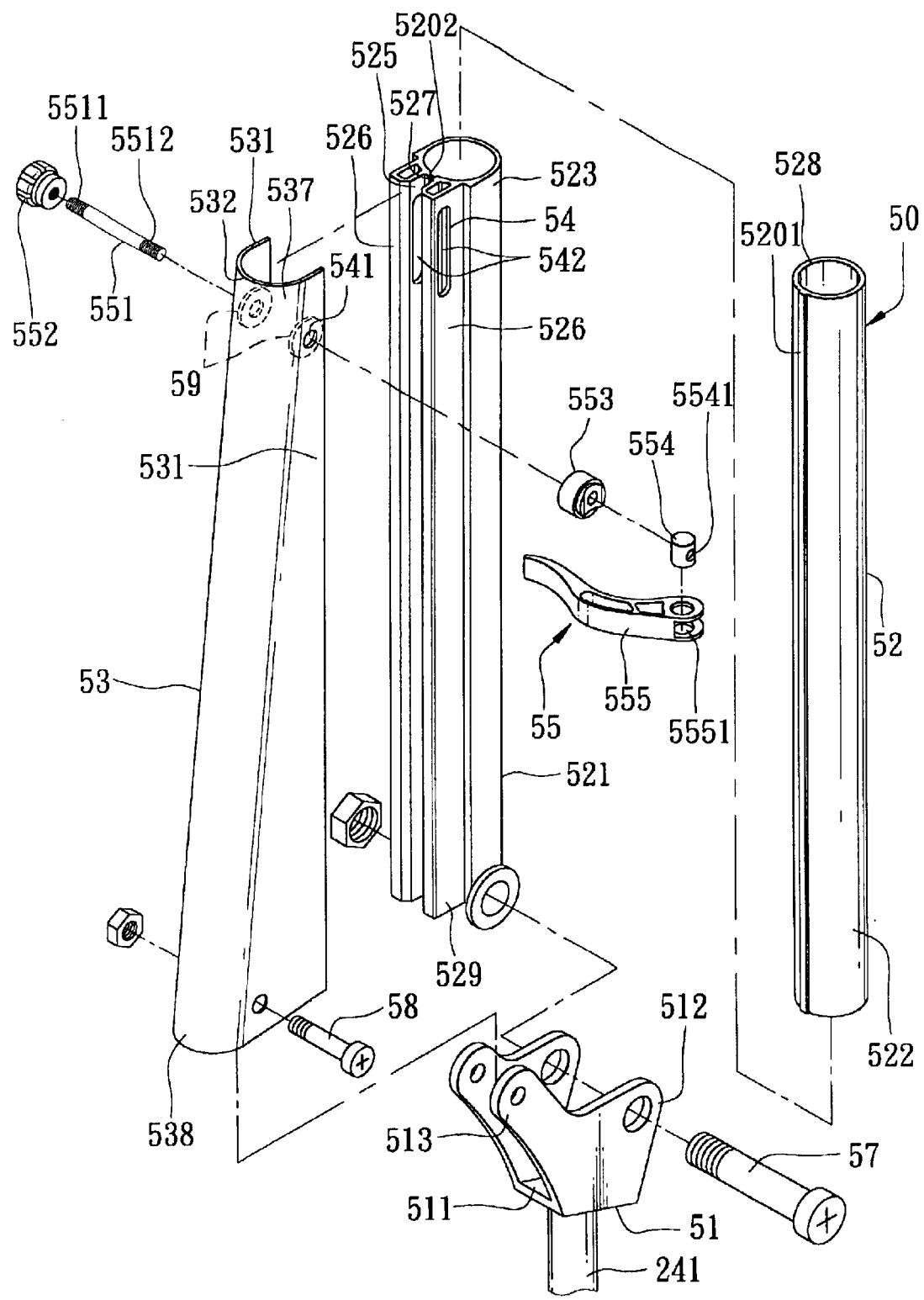
FIG. 3 is an exploded perspective view illustrating a handlebar unit of the preferred embodiment.

Referring to FIG. 2 and 3, the handlebar unit 50 includes a frame mounting member 51, an elongate front pivot member 52, an elongate rear pivot member 53, a releasable fastening unit 55, and a handlebar 56.

The frame mounting member 51, which is disposed on top of the head tube 23 of the bicycle frame 20, includes a base portion 511 formed with a front lug unit 512 and a rear lug unit 513 opposite to each other in a first direction. A top end 241 of the front fork 24 of the bicycle frame 20 extends through the head tube 23 and is fixed to a bottom side of the base portion 511 so as to permit steering control of the front wheel 31 on the front fork 24.

The front pivot member 52 extends in a second direction, and includes an outer tube 521 and an inner tube 522 slidably extending into the outer tube 521. The inner tube 522 is formed with a front upper section 528 of the front pivot member 52. The handlebar 56 is connected to the front upper section 528. The outer tube 521 is formed with a front lower section 529 of the front pivot member 52 that is opposite to the front upper section 528 in the second direction, and a coupling part 54 between the front lower section 529 and the front upper section 528. The front lower section 529 is connected pivotally to the front lug unit 512 by a front pivot axle 57 that defines a first pivot axis transverse to the first direction such that the front lower section 529 is pivotable thereabout.

The outer tube 521 includes a tube body 523 formed with a slit 527 that extends in the second direction, and a pair of coupling lugs 526 that are disposed on opposite sides of the slit 527, that cooperate to form a notch 525 therebetween, and that serve as the coupling part 54 of the front pivot member 52. In this embodiment, the coupling part 54 of the front pivot member 52 is formed with a slot unit that includes a pair of slots 542, each of which is formed in a respective one of the coupling lugs 526 and extends along the length of the coupling part 54 of the front pivot member 52.

In the preferred embodiment, the front pivot member 52 further includes means 520 for arresting relative rotation between the outer and inner tubes 521, 522. In this embodiment, the arresting means 520 includes an axially extending key 5201 formed along the inner tube 522, and an axially extending keyway 5202 formed along the outer tube 521 to slidably engage the key 5201, thereby arresting relative rotation between the outer and inner tubes 521, 522 while permitting sliding movement of the inner tube 522 in the second direction relative to the outer tube 521. It should be noted herein that the positions of the key 5201 and the keyway 5202 may be interchanged without affecting the intended result.

The rear pivot member 53 extends in a third direction, and has a rear lower section 538 and a rear upper section 537 opposite to each other in the third direction. The rear lower section 538 is connected pivotally to the rear lug unit 513 by a rear pivot axle 58 and is thus pivotable about a second pivot axis parallel to the first pivot axis defined by the front pivot axle 57. The rear upper section 537 of the rear pivot member 53 is formed with a pair of wing plates 531 that are interconnected by a connecting plate 532. The wing plates 531 confine the coupling lugs 526 of the coupling part 54 of the front pivot member 52 therebeween. The rear upper section 537 of the rear pivot member 53 is formed with a hole unit that includes a pair of holes 541, each of which is formed in a respective one of the wing plates 531, and that has a hole axis parallel to the first and second pivot axes. It should be noted herein that the positions of the hole unit and the slot unit in the rear upper section 537 of the rear pivot member 53 and the coupling part 54 of the front pivot member 52 may be likewise interchanged without affecting the intended result.

The releasable fastening unit 55 extends through the hole unit and the slot unit, and is operable so as to press the coupling part 54 of the front pivot member 52 and the rear upper section 537 of the rear pivot member 53 firmly against each other, thereby enabling the rear pivot member 53 to support the front pivot member 52 at a desired inclination relative to the frame mounting member 51. The releasable fastening unit 55 includes a connecting rod 551, a cap 552, a press member 553, a pivot 554, and a lever 555.

The connecting rod 551 passes through the holes 541 in the wing plates 531, the slots 542 in the coupling lugs 526, and the notch 525 between the coupling lugs 526, and has opposite first and second ends 5511, 5512.

The cap 552 is mounted on the first end 5511 of the connecting rod 551, and presses against an outer plate surface of one of the wing plates 531.

The press member 553 has the second end 5512 of the connecting rod 551 passing therethrough, and is disposed adjacent to an outer plate surface of the other one of the wing plates 531.

The pivot 554 is formed with an internally threaded pivot hole 5541 for mounting on the second end 5512 of the connecting rod 551, and defines a third pivot axis transverse to the connecting rod 551.

Figure 4:
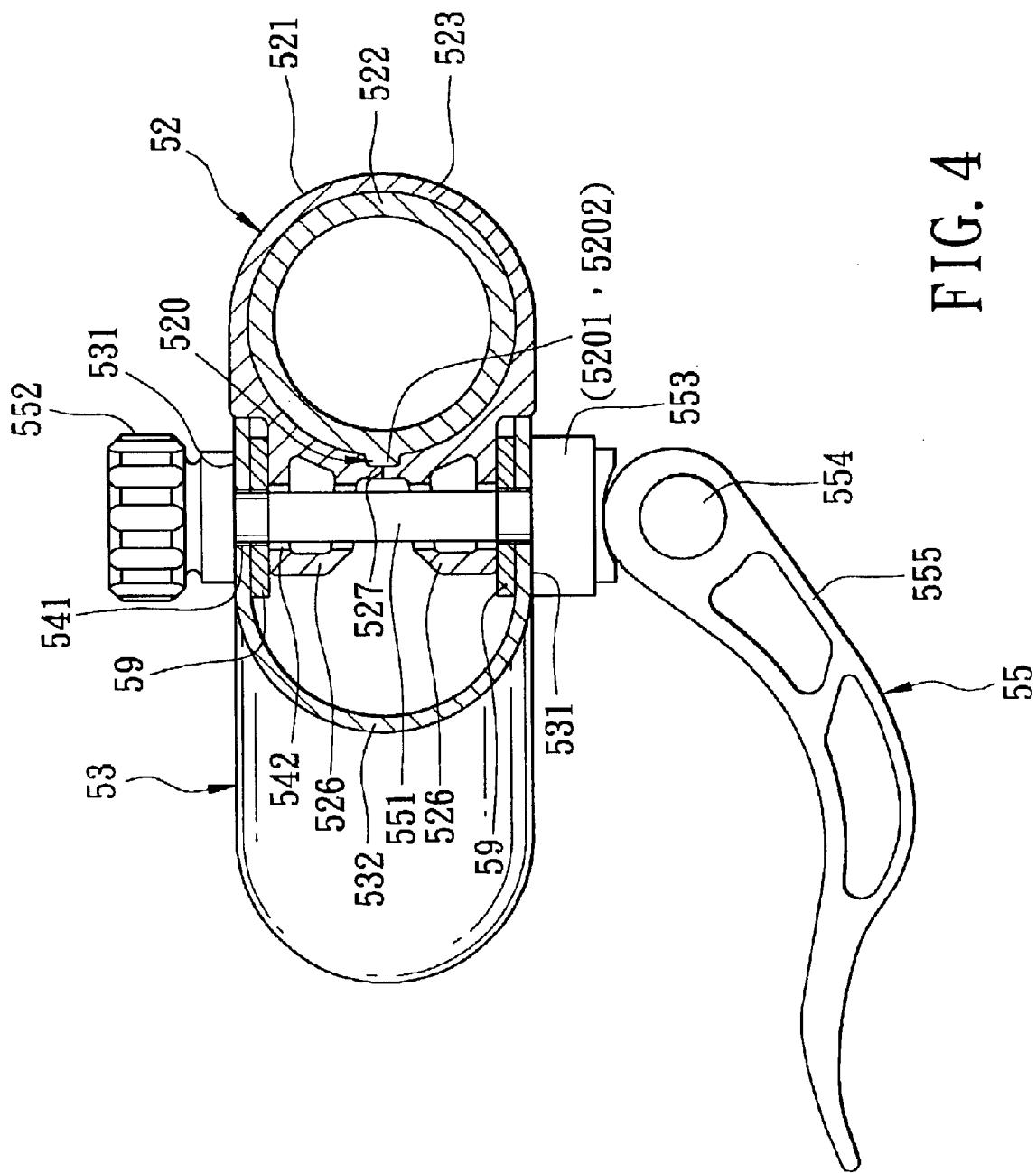
FIG. 4 is a sectional view of the preferred embodiment to illustrate a fastening state of a releasable fastening unit of the handlebar unit.

The lever 555 is formed with a pivot hole 5551 for connecting with the pivot 554, and is pivotable about the third pivot axis so as to urge the press member 553 toward the cap 552 for pressing the coupling part 54 of the front pivot member 52 and the rear upper section 537 of the rear pivot member 53 firmly against each other, as best shown in FIG. 4.

Preferably, two washers 59 are sleeved on the connecting rod 551 and are disposed between a respective coupling lug 526 and a respective wing plate 531.

Referring to FIGS. 2 to 4, when the lever 555 is operated so as to urge the press member 553 toward the cap 552 for pressing the coupling part 54 of the front pivot member 52 and the rear upper section 537 of the rear pivot member 53 firmly against each other, the slit 527 is closed to enable the outer tube 521 to engage tightly the inner tube 522. Hence, the handlebar 56 on the front upper section 528 of the front pivot member 52 is retained at a desired height relative to the frame mounting member 51 at this time.

Figure 5:
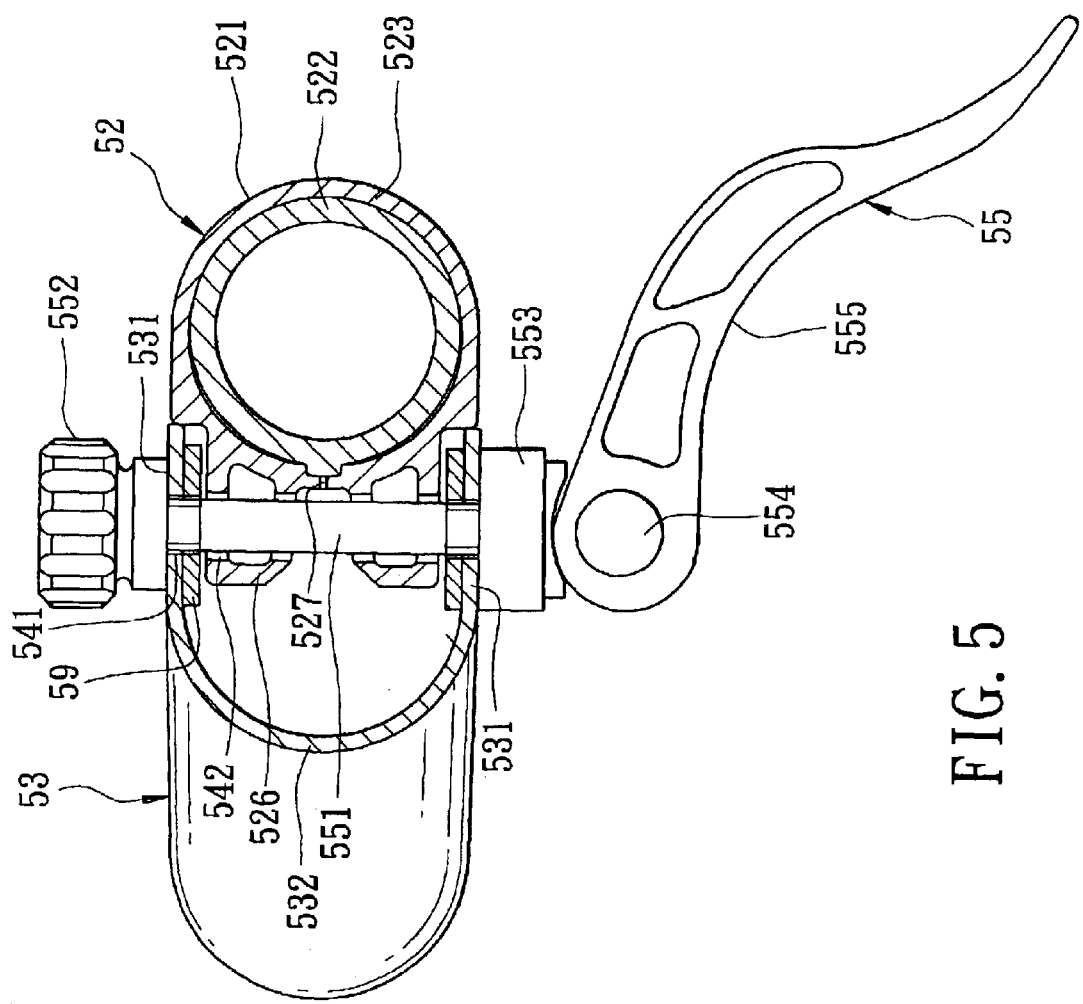
FIG. 5 is another sectional view of the preferred embodiment to illustrate a releasing state of the releasable fastening unit of the handlebar unit.
Figure 6:
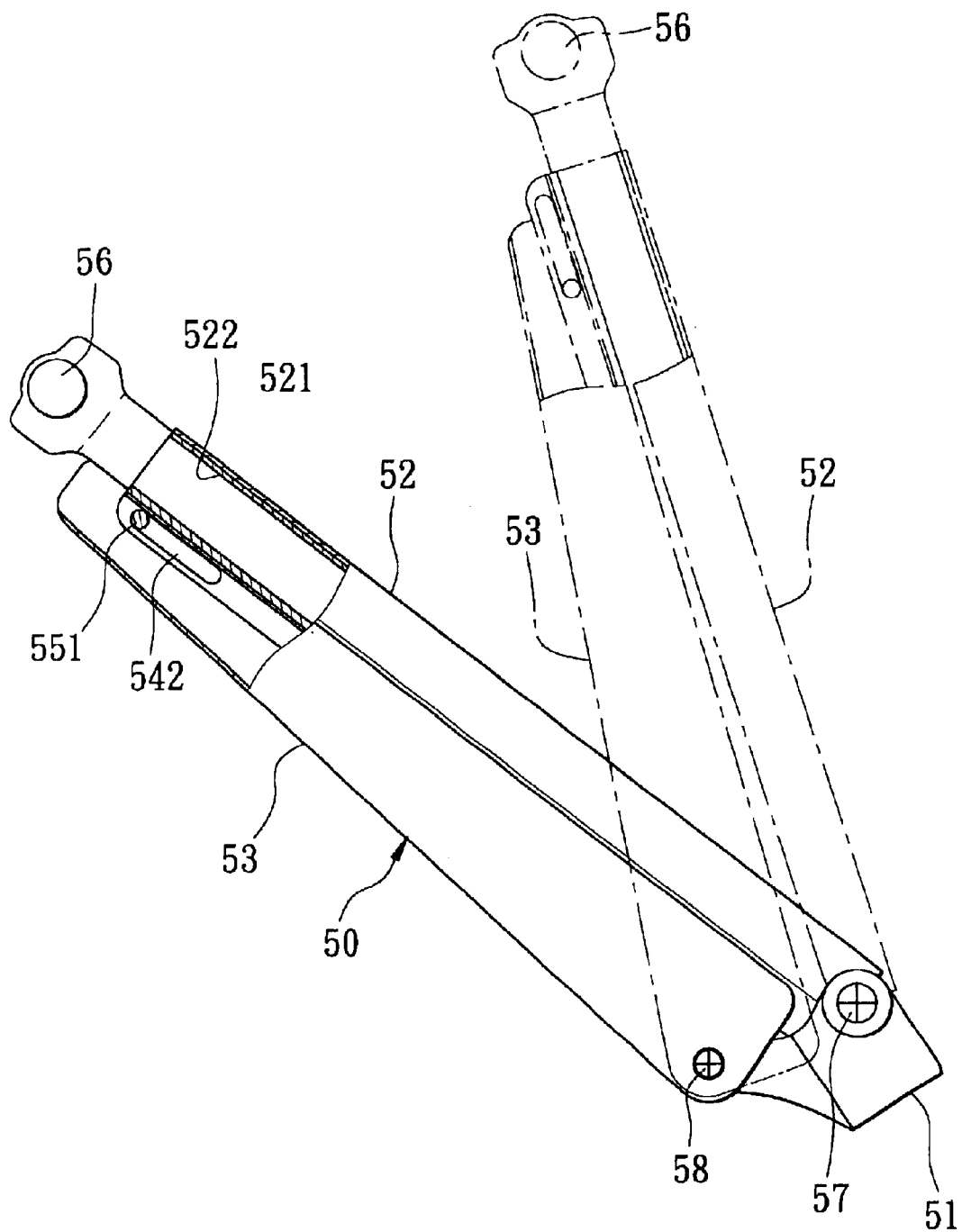
FIG. 6 is a schematic partly sectional view to illustrate how handlebar distance can be adjusted in the preferred embodiment of this invention.
Figure 7:
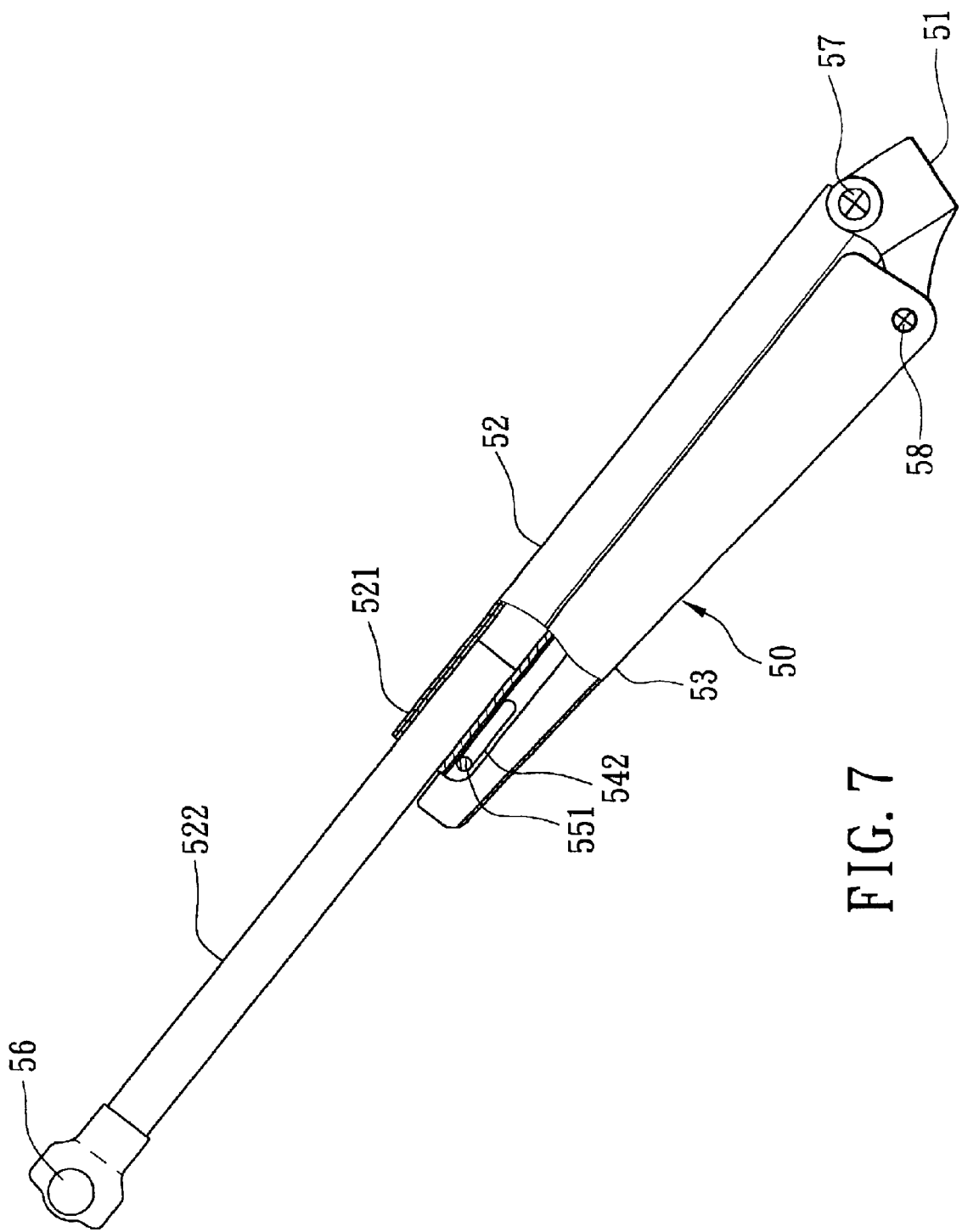
FIG. 7 is a schematic partly sectional view to illustrate how handlebar height can be adjusted in the preferred embodiment of this invention.

Referring to FIGS. 2, 3 and 5, when the lever 555 is operated such that the press member 553 moves slightly away from the cap 552, the coupling part 54 of the front pivot member 52 and the rear upper section 537 of the rear pivot member 53 are not pressed tightly against each other, and the slit 527 is opened to enable the outer tube 521 to loosely engage the inner tube 522. Hence, the inner tube 522 can be moved in the second direction to dispose the front upper section 528 of the front pivot member 52 at a desired height relative to the frame mounting member 51 in order to adjust the height of the handlebar 56 relative to the seat unit 60 on the bicycle frame 20 accordingly, as best shown in FIG. 7. At the same time, the rear pivot member 53 and the front pivot member 52 can be pivoted respectively about the second and first pivot axes so as to adjust the distance between the handlebar 56 and the seat unit 60, as best shown in FIG. 6. After adjusting the handlebar 56 to the desired height and distance, the releasable fastening unit 55 can be operated to once again press the coupling part 54 of the front pivot member 52 and the rear upper section 537 of the rear pivot member 53 firmly against each other.

Figure 8:
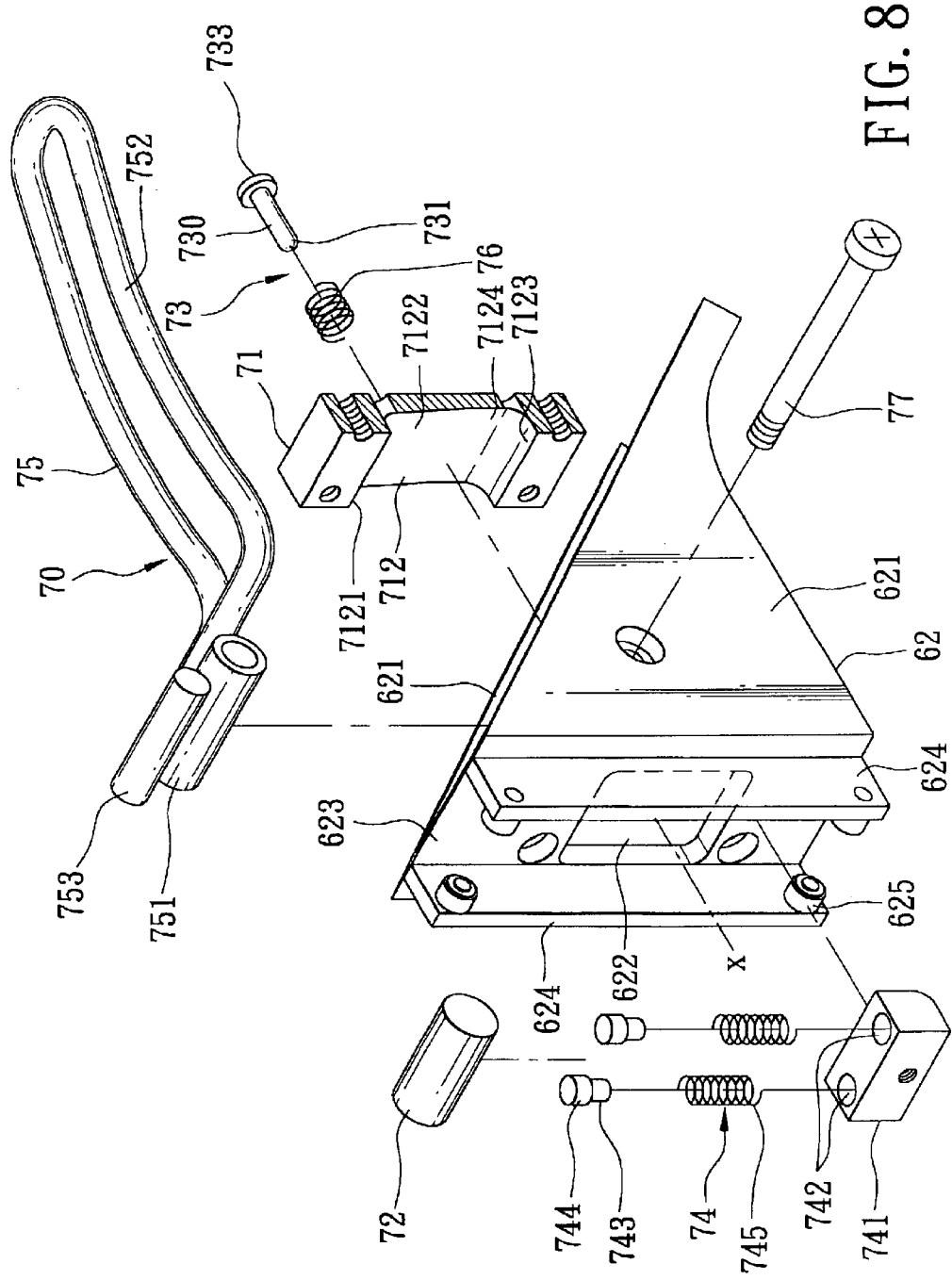
FIG. 8 is an exploded perspective view illustrating a seat unit of the preferred embodiment.
Figure 9:
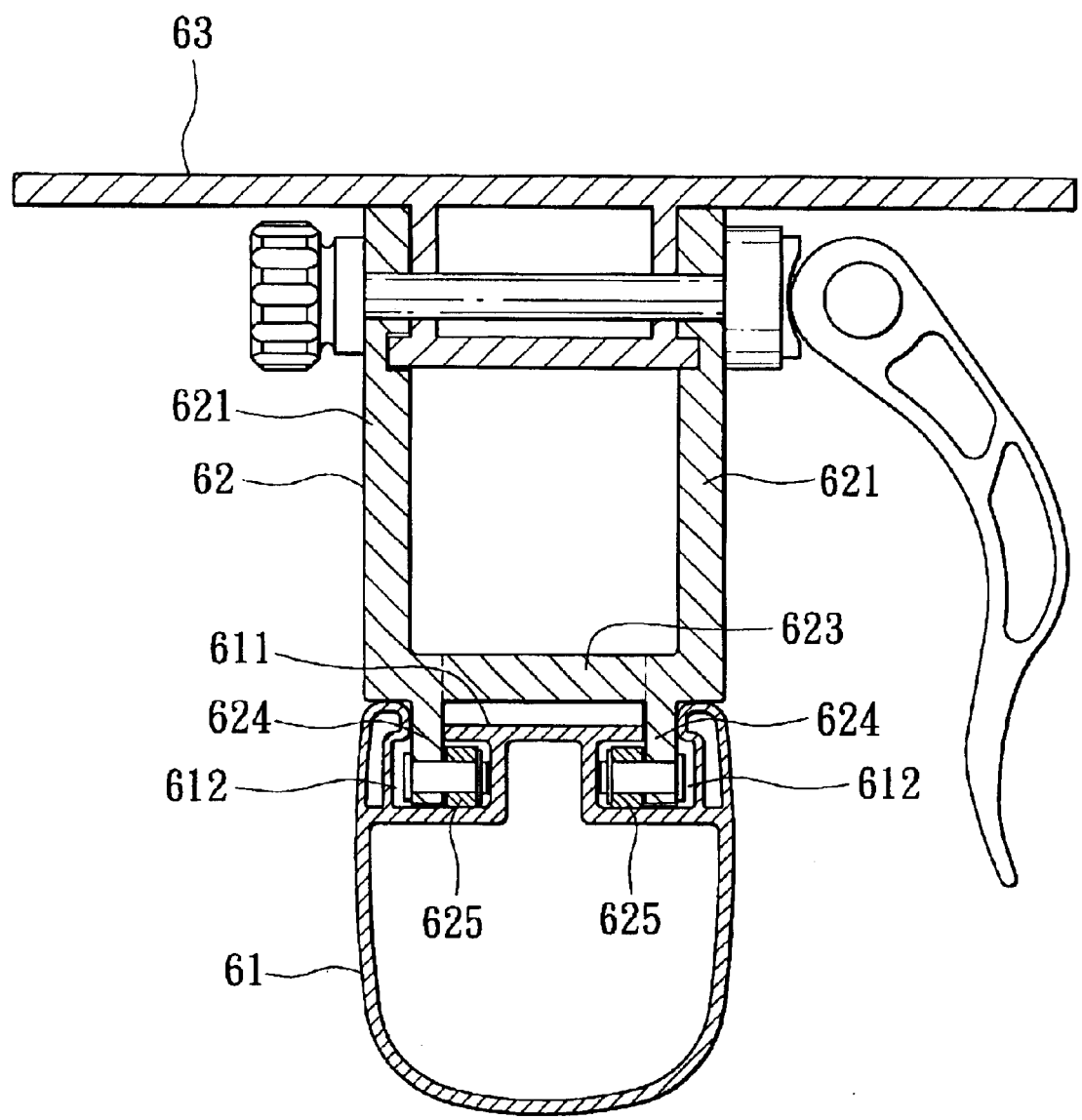
FIG. 9 is a schematic sectional view of the preferred embodiment to illustrate coupling between a slide base and a seat support rod of the seat unit.

Referring to FIGS. 2, 8 and 9, the seat unit 60 is shown to include a seat support rod 61, a slide base 62, a seat member, and a releasable positioning unit 70.

The seat member includes a connecting unit in the form of a connecting plate 63, a generally L-shaped seat frame 64 mounted on the connecting plate 63, and a seat pad 65 and a backrest pad 66 mounted on a horizontally extending seat pad mounting portion 641 and a vertically extending backrest pad mounting portion 642 of the seat frame 64, respectively.

The seat support rod 61 has a lower end mounted on the top frame member 22 of the bicycle frame 20, and an upper end opposite to the lower end in a longitudinal direction, and inclines rearwardly and upwardly from the lower end to the upper end. The seat support rod 61 further has a top side 611 that is formed with a pair of slide grooves 612 that extend in the longitudinal direction.

The slide base 62 includes a pair of lateral plates 621, a bridging plate 623, a block member 71, and a plurality of rollers 625.

The lateral plates 621 are spaced apart from each other in a transverse direction transverse to the longitudinal direction. Each of the lateral plates 621 has a first edge for mounting of the connecting plate 631 of the seat member thereon, and a second edge extending inclinedly from the first edge.

The bridging plate 623 interconnects the second edges of the lateral plates 621, is formed with a through hole 622 that defines an axis (X), and is further formed with a pair of slide rails 624 that extend in the longitudinal direction and that are in sliding engagement with the slide grooves 612, respectively. Accordingly, the slide base 62 is slidable on the seat support rod 61 along the longitudinal direction.

The block member 71 is mounted on the bridging plate 623 and is disposed between the lateral plates 621. A roller chamber 712 is formed in the block member 71, is accessible from the through hole 622 in the bridging plate 623, and extends along the longitudinal direction. The roller chamber 17 has a bottom wall, first and second ends 7121, 7123 opposite to each other in the longitudinal direction, and a depth that gradually increases in the longitudinal direction from the first end 7121 to the second end 7123, thereby forming the roller chamber 712 with a shallower section 7122 proximate to the first end 7121 and a deeper section 7124 between the shallower section 7122 and the second end 7123.

The rollers 625 are mounted rotatably on the slide rail 624 to smoothen sliding engagement between the seat support rod 61 and the slide base 62.

Since the connecting plate 63 is mounted on the lateral plates 621, the seat member of the seat unit 60 is slidable together with the slide base 62 along the seat support rod 61 so as to adjust the positions of the seat pad 65 and the backrest pad 66 relative to the handlebar unit 50.

Figure 10:
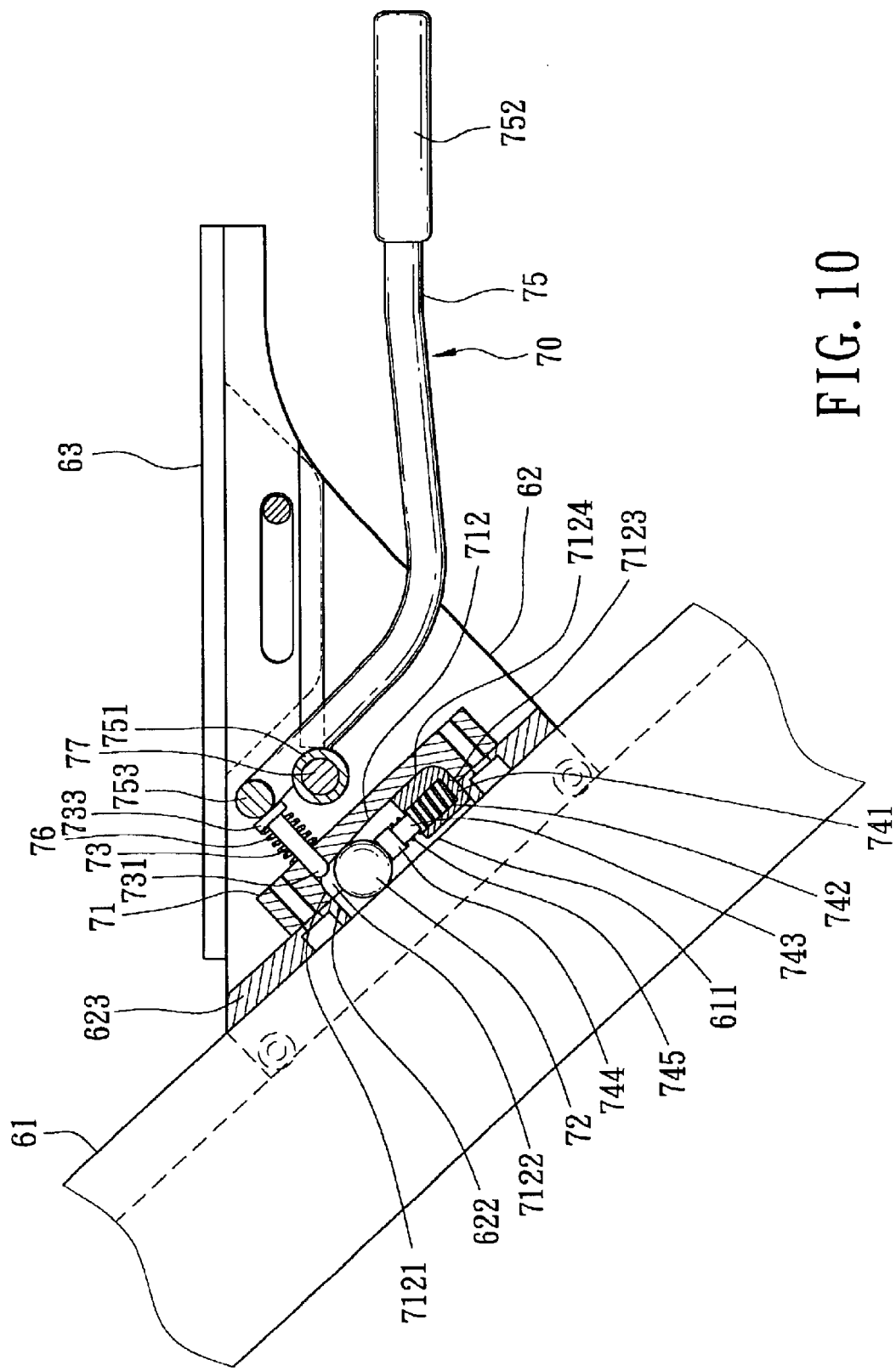
FIG. 10 is a fragmentary schematic sectional view of the seat unit of the preferred embodiment, illustrating how sliding movement of the slide base on the seat support rod is arrested.

As shown in FIGS. 8 and 10, the releasable positioning unit 70 includes a rolling member 72, a biasing member 74, and a release mechanism.

Figure 11:
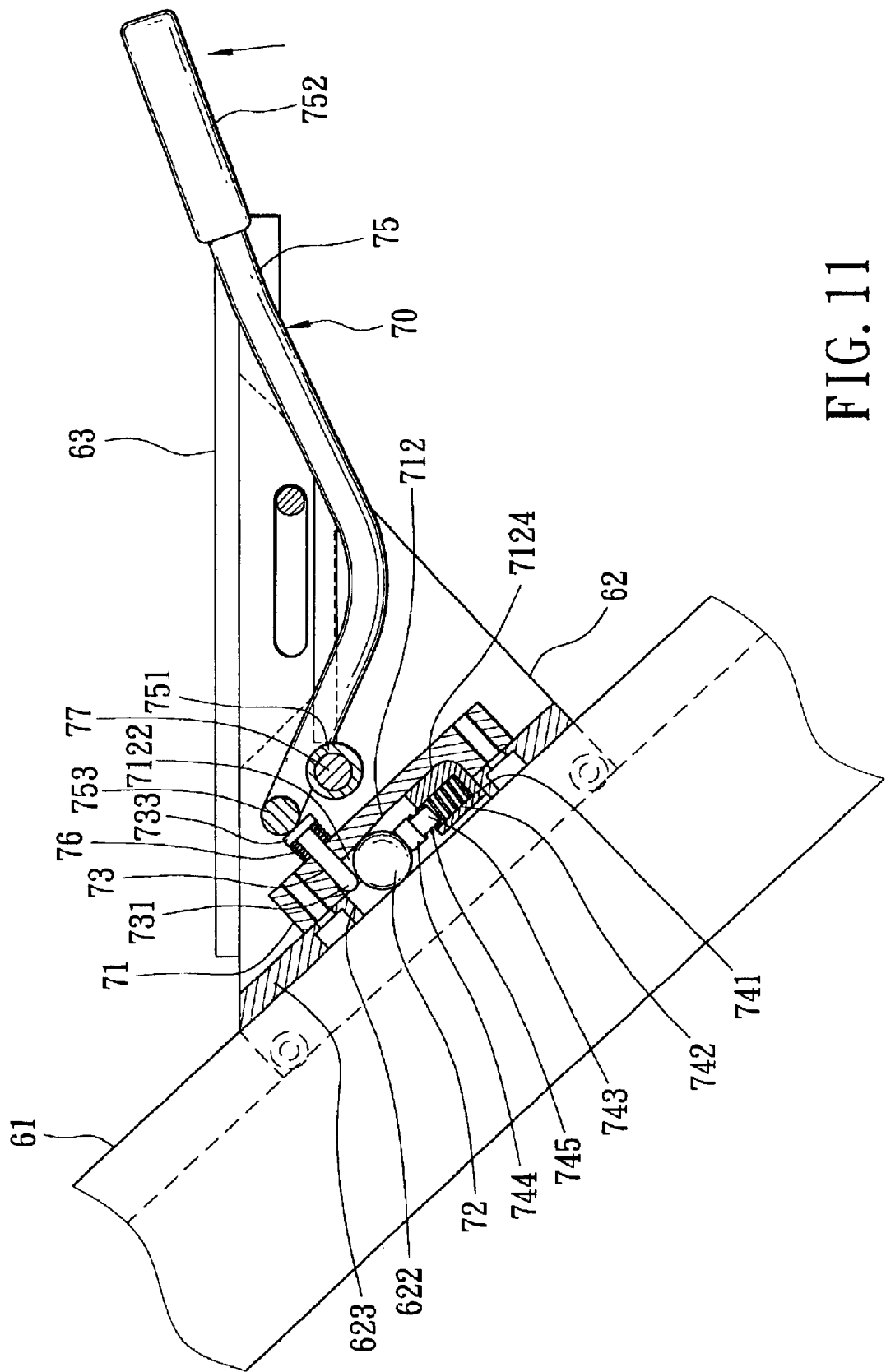
FIG. 11 is another fragmentary schematic sectional view of the seat unit of the preferred embodiment, illustrating how sliding movement of the slide base on the seat support rod is permitted.

The rolling member 72 is in the form of a cylinder, is disposed in the roller chamber 712, is in rolling contact with the bottom wall of the roller chamber 712, and extends through the through hole 622 in the bridging plate 623 to contact rollingly the top side 611 of the seat support rod 61. The rolling member 72 is movable in the roller chamber 712 along the longitudinal direction between the shallower and deeper sections 7122, 7124 such that the rolling member 72 arrests sliding movement of the slide base 62 in the longitudinal direction toward the lower end of the seat support rod 61 when disposed in the shallower section 7122 of the roller chamber 712, as best shown in FIG. 10, and permits sliding movement of the slide base 62 along the seat support rod 61 when disposed in the deeper section 7124 of the roller chamber 712, as best shown in FIG. 11.

The biasing member 74 includes an anchoring block 741, a pair of push pins 743, and a pair of coiled compression spring 745. The anchoring block 741 is mounted fixedly in the roller chamber 712 proximate to the second end 7123, and is formed with a pair of spring holes 742. Each of the push pins 743 includes a pin head 744 for abutting against the rolling member 72, and is aligned with a corresponding spring hole 742. Each of the compression springs 745 has one end sleeved on a corresponding push pin 743, and an opposite end received in a corresponding spring hole 742. The opposite ends of the compression springs 745 thus act on the rolling member 72 and the second end 7123 of the roller chamber 712, respectively, so as to bias the rolling member 72 toward the shallower section 7122 of the roller chamber 712.

The release mechanism includes a spring-loaded actuator 73 and an operating lever 75.

The spring-loaded actuator 73 includes a push rod 730 and a biasing spring 76. The push rod 730 includes a push head 733 disposed on one side of the block member 71 opposite to the roller chamber 712, and a shank section 731 extending from the push head 733 along the axis (x) and extendible into the shallower section 7122 of the roller chamber 712 for pushing the rolling member 72 from the shallower section 7122 into the deeper section 7123 of the roller chamber 712, as best shown in FIG. 11. The biasing spring 76 is a coiled compression spring sleeved on the shank section 731 and having opposite ends acting on the block member 71 and the push head 733, respectively.

The operating lever 75 has a pivot portion 751 mounted pivotally between the lateral plates 621 of the slide base 62 by means of a pivot pin 77, and a handle portion 752 and a press portion 753 extending respectively from opposite sides of the pivot portion 751. The press portion 753 extends toward the spring-loaded actuator 73, and abuts against the push head 733 of the spring-loaded actuator 73. The handle portion 752 extends out of the slide base 62 and is disposed under the seat frame 64. The handle portion 752 is operable so as to pivot the operating lever 7 about the pivot pin 77 and so as to cause the press portion 753 to force the spring-loaded actuator 73 to extend into the shallower section 7122 of the roller chamber 712 for pushing the rolling member 72 from the shallower section 172 into the deeper section 7124 of the roller chamber 712 (see FIG. 11).

Referring to FIG. 10, under normal conditions, by virtue of the biasing action of the compression springs 745 of the biasing member 74, the push pins 743 will push the rolling member 72 to move toward the first end 7121 of the roller chamber 712 such that the rolling member 72 is disposed in the shallower section 7122 and arrests sliding movement of the slide base 62 toward the lower end of the seat support rod 61, thereby anchoring the seat frame 64 on the seat support rod 61.

Referring to FIG. 11, when the handle portion 752 of the operating lever 75 is operated, the operating lever 75 will push the push rod 730 of the spring-loaded actuator 73 through the press portion 753, thereby driving the shank section 731 to extend into the roller chamber 712 against the biasing force of the biasing member 76, and to push the rolling member 72 toward the second end 7123 of the roller chamber 712 and into the deeper section 7124. Since the rolling member 72 can freely rotate in the deeper section 7124, the slide base 62 can be slid smoothly along the slide grooves 612 of the seat support rod 61 via the rollers 625 until the handle portion 752 is released. When the handle portion 752 is released, the restoring actions of the biasing member 74 and the spring-loaded actuator 73 ensure that the slide base 62 is once again anchored at a certain point on the seat support rod 61. As shown in FIG. 2, since the seat support rod 61 inclines rearwardly and upwardly, when the slide base 62 slides along the seat support rod 61, apart from adjusting the height of the seat member on the slide base 62, the distance of the seat member from the handlebar unit 50 will be adjusted as well.

Figure 12:
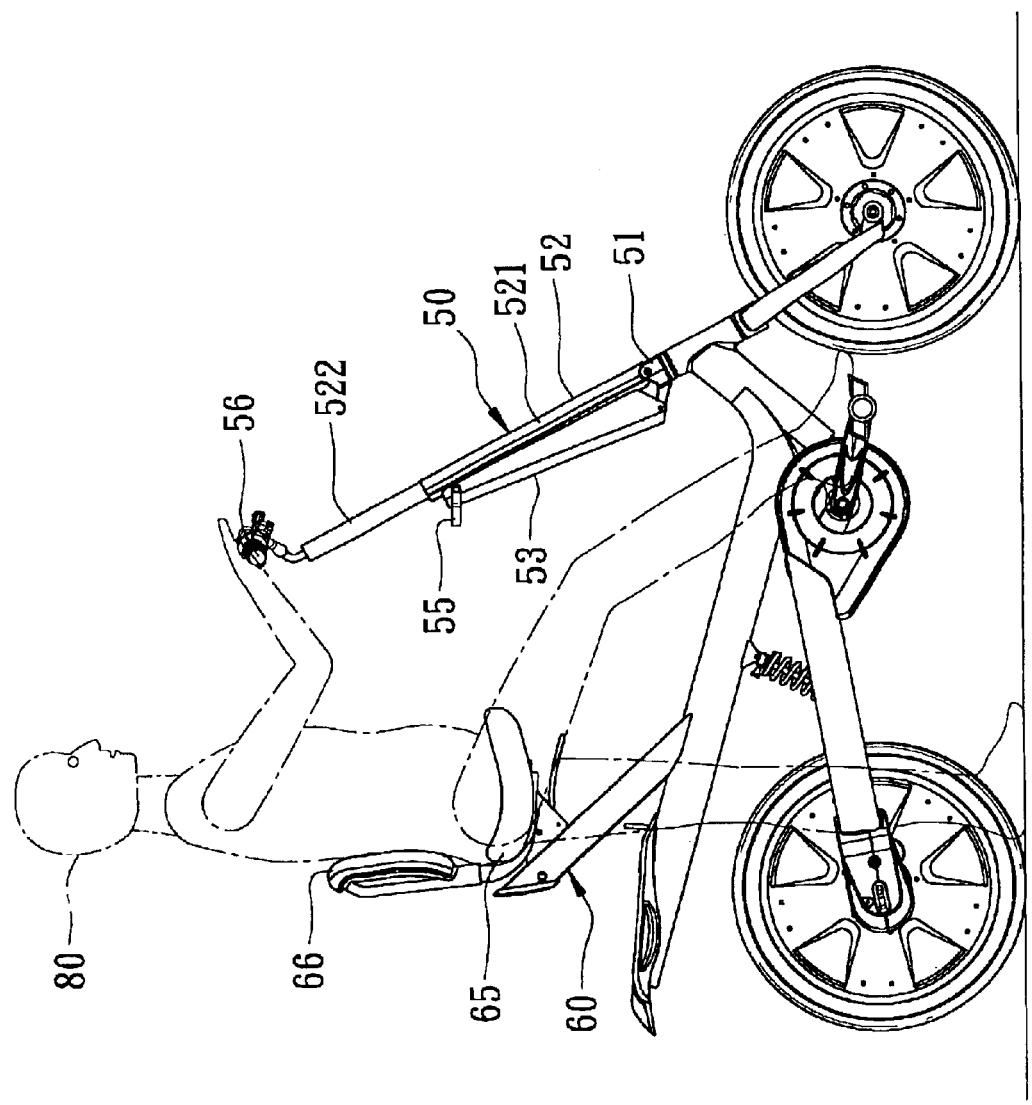
FIG. 12 is a schematic diagram illustrating the preferred embodiment when adjusted for use by a taller person.
Figure 13:
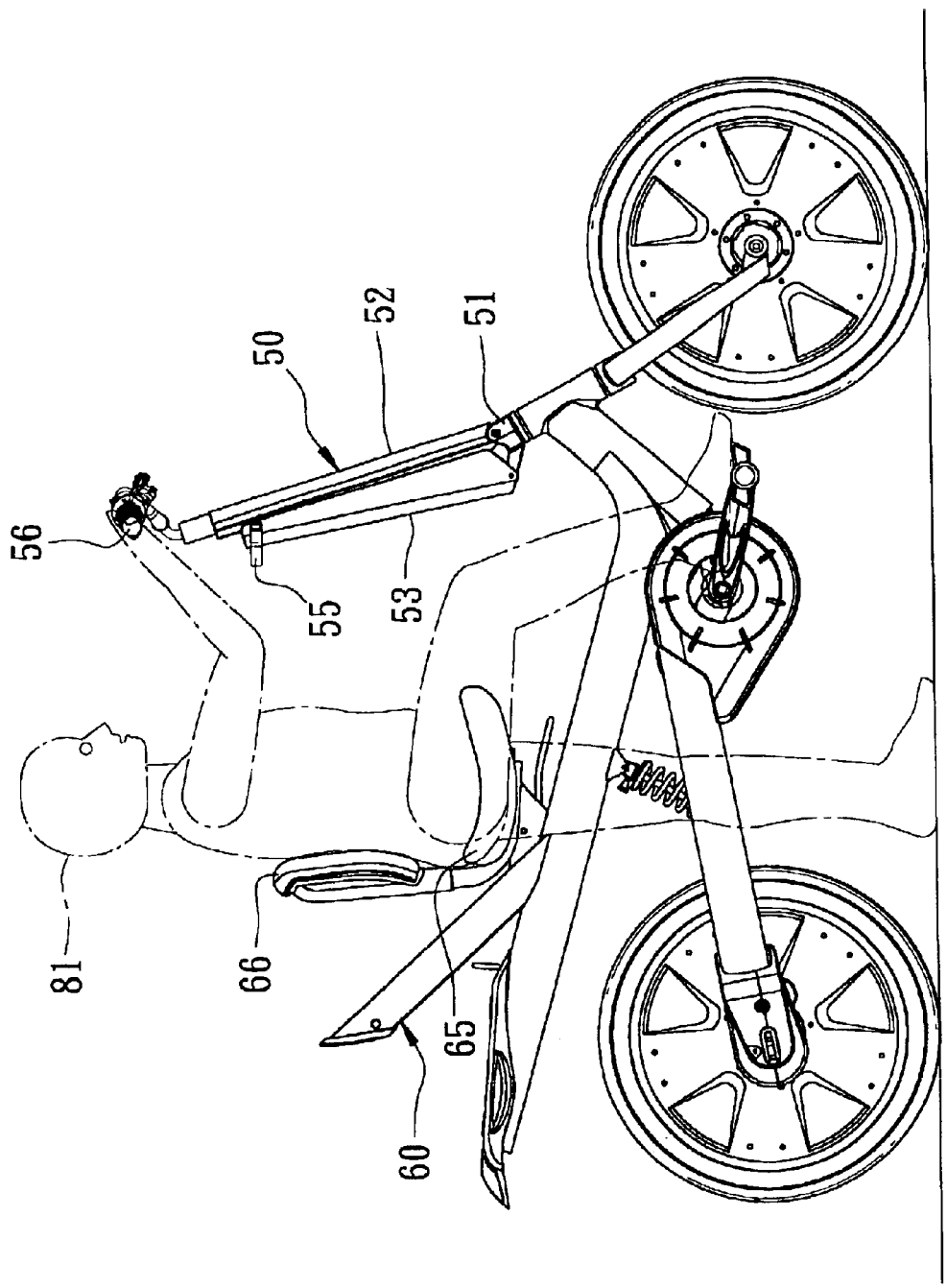
FIG. 13 is a schematic diagram illustrating the preferred embodiment when adjusted for use by a shorter person.

As shown in FIGS. 12 and 13, in view of the adjustable configurations of the handlebar unit 50 and the seat unit 60 of the bicycle according to this invention, the bicycle is suitable for use by both taller and shorter persons 80, 81. Upon adjustment of the handlebar and seat units 50, 60, the back of the user 80, 81 can be adequately supported by the seat unit 60, the handlebar 56 can be comfortably grasped by the user 80, 81, and both feet of the user 80, 81 can touch the ground stably when dismounting from the bicycle.

While the present invention has been described in connection with what is considered the most practical and

I claim:

1. A bicycle comprising:
   a bicycle frame having front and rear ends:
   a wheel set including front and rear wheels disposed respectively on said front and rear ends of said bicycle frame:
   a treading unit mounted on said bicycle frame for transmitting treading power to said wheel set,
   a handlebar unit mounted on said bicycle frame and coupled to said front wheel to permit steering of said front wheel said handlebar unit being pivotable toward and away from said rear end of said bicycle frame; and
   a seat unit mounted adjustably on said bicycle frame to permit height adjustment thereof relative to said handlebar unit;
   wherein said handlebar unit includes:
   a handlebar;
   a frame mounting member mounted on said bicycle frame, coupled to said front wheel, and formed with a front lug unit and a rear lug unit opposite to each other in a first direction;
   an elongate front pivot member extending in a second direction and having a front lower section and a front upper section opposite to each other in the second direction, said front lower section being connected pivotally to said front lug unit and being pivotable about a first pivot axis transverse to the first direction, said front upper section being connected to said handlebar, said front pivot member further having a coupling part between said front lower section and said front upper section;
   an elongate rear pivot member extending in a third direction and having a rear lower section and a rear upper section opposite to each other in the third direction, said rear lower section being connected pivotally to said rear lug unit and being pivotable about a second pivot axis parallel to the first pivot axis;
   one of said coupling part of said front pivot member and said rear upper section of said rear pivot member being formed with a hole unit that has a hole axis parallel to the first and second pivot axes;
   the other of said coupling part of said front pivot member and said rear upper section of said rear pivot member being formed with a slot unit that extends along length of the other of said coupling part of said front pivot member and said rear upper section of said rear pivot member; and
   a releasable fastening unit extending through said hole unit and said slot unit and operable so as to press said coupling part of said front pivot member and said rear upper section of said rear pivot member firmly against each other, thereby enabling said rear pivot member to support said front pivot member at a desired inclination relative to said frame mounting member.

2. The bicycle as claimed in claim 1, wherein said front pivot member includes an outer tube formed with said front lower section and said coupling part, and an inner tube slidably extending into said outer tube and formed with said front upper section.

3. The bicycle as claimed in claim 2, further comprising means for arresting relative rotation between said outer and inner tubes.

4. The bicycle as claimed in claim 2, wherein one of said outer and inner tubes is formed with an axially extending key therealong, and the other of said outer and inner tubes is formed with an axially extending keyway therealong to slidably engage said key and to arrest relative rotation between said outer and inner tubes while permitting sliding movement of said inner tube in the second direction relative to the outer tube.

5. The bicycle as claimed in claim 1, wherein said fastening unit includes:
   a connecting rod passing through said hole unit and said slot unit, said connecting rod having first and second ends;
   a cap mounted on said first end of said connecting rod;
   a press member having said second end of said connecting rod passing therethrough;
   a pivot mounted on said second end of said connecting rod and defining a third pivot axis transverse to said connecting rod; and
   a lever connected to said pivot and pivotable about the third pivot axis so as to urge said press member toward said cap for pressing said coupling part of said front pivot member and said rear upper section of said rear pivot member firmly against each other.

6. A bicycle comprising:
   a bicycle frame having front and rear ends;
   a wheel set including front and rear wheels disposed respectively on said front and rear ends of said bicycle frame;
   a treading unit mounted on said bicycle frame for transmitting treading power to said wheel set;
   a handlebar unit mounted on said bicycle frame and coupled to said front wheel to permit steering of said front wheel, said handlebar unit being pivotable toward and away from said rear end of said bicycle frame; and a seat unit mounted adjustably on said bicycle frame to permit height adjustment thereof relative to said handlebar unit;

wherein said seat unit includes:

a seat member;

a seat support rod having a lower end mounted on said bicycle frame, and an upper end opposite to said lower end in a longitudinal direction, said seat support rod inclining rearwardly and upwardly from said lower end to said upper end;

a slide base having said seat member mounted thereon, said slide base having one side coupled slidably to said seat support rod such that said slide base is slidable on said seat support rod along the longitudinal direction, said one side of said slide base being formed with a roller chamber that extends along the longitudinal direction, said roller chamber having a bottom wall, first and second ends opposite to each other in the longitudinal direction, and a depth that gradually increases in the longitudinal direction from said first end to said second end, thereby forming said roller chamber with a shallower section proximate to said first end and a deeper section between said shallower section and said second end; and a releasable positioning unit including a rolling member disposed in said roller chamber and in rolling contact with said seat support rod and said bottom wall of said roller chamber, said rolling member being movable in said roller chamber along the longitudinal direction between said shallower and deeper sections, said rolling member arresting sliding movement of said slide base in the longitudinal direction toward said lower end of said seat support rod when disposed in said shallower section of said roller chamber, and permitting sliding movement of said slide base along said seat support rod when disposed in said deeper section of said roller chamber, a biasing member disposed in said roller chamber and biasing said rolling member toward said shallower section of said roller chamber, and a release mechanism mounted on said slide base and operable so as to extend into said roller chamber and said rolling member from said shallower section into said deeper section of said roller chamber against biasing action of said biasing member.

* * * * *